(12) United States Patent
Soma et al.

(10) Patent No.: US 7,759,817 B2
(45) Date of Patent: Jul. 20, 2010

(54) POWER SUPPLY SYSTEM FOR DRIVING VEHICLE

(75) Inventors: Takaya Soma, Toyota (JP); Hiroshi Yoshida, Anjo (JP); Takeshi Mogari, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 195 days.

(21) Appl. No.: 12/087,876

(22) PCT Filed: Feb. 27, 2007

(86) PCT No.: PCT/JP2007/054148

§ 371 (c)(1),
(2), (4) Date: Jul. 16, 2008

(87) PCT Pub. No.: WO2007/102450

PCT Pub. Date: Sep. 13, 2007

(65) Prior Publication Data

US 2009/0160249 A1 Jun. 25, 2009

(30) Foreign Application Priority Data

Mar. 9, 2006 (JP) ............................. 2006-064413

(51) Int. Cl.
*B60L 1/00* (2006.01)

(52) U.S. Cl. ...................................................... 307/9.1
(58) Field of Classification Search .................. 307/9.1
See application file for complete search history.

(56) References Cited

FOREIGN PATENT DOCUMENTS

| JP | A-2000-270561 | 9/2000 |
|----|---------------|--------|
| JP | A-2001-327001 | 11/2001 |
| JP | A-2005-056728 | 3/2005 |
| JP | A-2005-116485 | 4/2005 |
| JP | A-2005-245049 | 9/2005 |
| JP | A-2005-261040 | 9/2005 |
| JP | A-2006-050779 | 2/2006 |
| JP | A-2007-089262 | 4/2007 |
| JP | A-2007-089264 | 4/2007 |
| WO | WO 2006/014016 A1 | 2/2006 |

*Primary Examiner*—Robert L. Deberadinis
(74) *Attorney, Agent, or Firm*—Oliff & Berridge, PLC (57) ABSTRACT

A power supply system for driving a vehicle includes a battery, a boost converter boosting the voltage of the battery, a capacitor to which the voltage boosted by the boost converter is applied across the electrodes, system main relays provided between the capacitor and the output of the boost converter for connection and disconnection between the capacitor and the boost converter, and a control device controlling the boost converter and the system main relays. The control device, after giving an instruction for disconnection to the system main relays, causes the boost converter to change the voltage of the output to determine whether the system main relays are normally disconnected.

14 Claims, 6 Drawing Sheets

POWER SUPPLY SYSTEM FOR DRIVING VEHICLE

TECHNICAL FIELD

The present invention relates to a power supply system for driving a vehicle, and particularly to a power supply system for driving a vehicle provided with a secondary battery and a capacitor.

BACKGROUND ART

The electric vehicle and hybrid vehicle provided with a motor as a source of driving force have attracted attention in recent years. These vehicles are provided with a battery having relatively high voltage for supplying electric power to the motor, in which a relay is disposed between the battery and the motor for connection and disconnection of the power supply.

During power-up, the relay is activated to supply the electric power to the motor. If a large current flows when the relay is turned on, an electric discharge may occur between the movable contact and the fixed contact to cause the contacts to be welded. The welding of the relay contacts causes a problem that the power supply cannot be shut down. Thus, as indicated in Japanese Patent Laying-Open No. 2001-327001, for example, the hybrid vehicle and the like are subjected to abnormality diagnosis for the power supply system including the relay at the time of activation of the system.

In recent years, it has been contemplated that a large-capacity power storage condenser (hereinafter referred to as a capacitor) is used as a power storage device in place of the battery. It has also been contemplated that the battery and the capacitor having different characteristics from each other are used in combination in the vehicle.

The capacitor has high voltage across its terminals as in the battery and is capable of accumulating the energy that allows the motor to be operated. Therefore, it is desirable to provide a relay that allows the capacitor and the motor to be disconnected while the vehicle is stopped.

However, as in Japanese Patent Laying-Open No. 2001-327001, the relay on the battery side is checked and, after that, the relay on the capacitor side is similarly checked, which causes a problem of being time-consuming. In other words, after the relay on the battery side is checked, the node on the load side to which the smoothing condenser is connected is once discharged. This requires the node on the load side to be again charged before the relay on the capacitor side is checked.

DISCLOSURE OF THE INVENTION

An object of the present invention is to provide a power supply system for driving a vehicle in which only a short period of time is required for checking and the secondary battery and the capacitor are used in combination.

In summary, the present invention provides a power supply system for driving a vehicle including a secondary battery, a voltage converter boosting a voltage of the secondary battery, a capacitor to which the voltage boosted by the voltage converter is applied across electrodes, a first connecting portion provided between the capacitor and an output of the voltage converter for connection and disconnection between the capacitor and the voltage converter, and a control device controlling the voltage converter and the first connecting portion. The control device, after giving an instruction for disconnection to the first connecting portion, causes the voltage converter to change the voltage of the output to determine whether the first connecting portion is normally disconnected.

Preferably, the first connecting portion includes a first relay connecting a positive electrode of the capacitor to a positive output node of the voltage converter and a second relay connecting a negative electrode of the capacitor to a negative output node of the voltage converter.

More preferably, the power supply system for driving the vehicle further includes a voltage sensor measuring the voltage of the capacitor. The control device, in response to an instruction to switch the vehicle from a drivable state to an undrivable state, gives an instruction for disconnection to one of the first and second relays, and subsequently, causes the voltage converter to change the output voltage and observes an output of the voltage sensor for a first determination.

Further preferably, the control device, after the first determination, resets the output voltage of the voltage converter to cause the first and second relays each to be in a connected state, gives an instruction for disconnection to the other one of the first and second relays, and subsequently, causes the voltage converter to change the output voltage and observes the output of the voltage sensor for a second determination.

Preferably, the power supply system for driving the vehicle further includes a second connecting portion provided between the secondary battery and an input of the voltage converter for connection and disconnection between the secondary battery and the voltage converter. The control device, in response to the instruction to switch the vehicle from the drivable state to the undrivable state, determines whether the first connecting portion is normally disconnected and subsequently confirms the operation of the second connecting portion.

More preferably, the power supply system for driving the vehicle further includes a voltage sensor detecting the voltage of the output of the voltage converter and a load connected to the output of the voltage converter. The control device, after it is confirmed that the first connecting portion is in a disconnected state, gives an instruction for disconnection to the second connecting portion, causes the load to consume electric power and observes the output of the voltage sensor to determine whether disconnection of the second connecting portion is normally effected.

Preferably, the capacitor includes a plurality of electric double layer condensers connected in series.

According to another aspect, the present invention provides a method of controlling a power supply system for driving a vehicle including a secondary battery, a voltage converter boosting a voltage of the secondary battery, a capacitor to which the voltage boosted by the voltage converter is applied across electrodes, a first connecting portion provided between the capacitor and an output of the voltage converter for connection and disconnection between the capacitor and the voltage converter, and a control device controlling the voltage converter and the first connecting portion. The method includes the steps of giving an instruction for disconnection to the first connecting portion, and determining whether the first connecting portion is normally disconnected by causing the voltage converter to change the voltage of the output after giving the instruction for disconnection.

Preferably, the first connecting portion includes a first relay connecting a positive electrode of the capacitor to a positive output node of the voltage converter and a second relay connecting a negative electrode of the capacitor to a negative output node of the voltage converter.

More preferably, the power supply system for driving the vehicle further includes a voltage sensor measuring the voltage of the capacitor. The step of giving the instruction for disconnection, in response to an instruction to switch the vehicle from a drivable state to an undrivable state, gives an instruction for disconnection to one of the first and second relays. The step of determining causes the voltage converter to change the output voltage and observes an output of the voltage sensor for a first determination.

Further preferably, the controlling method further includes the steps of, after the first determination, resetting the output voltage of the voltage converter to cause the first and second relays each to be in a connected state and giving an instruction for disconnection to the other one of the first and second relays; and, after giving the instruction for disconnection to the other one causing the voltage converter to change the output voltage and observing the output of the voltage sensor for a second determination.

Preferably, the power supply system for driving the vehicle further includes a second connecting portion provided between the secondary battery and an input of the voltage converter for connection and disconnection between the secondary battery and the voltage converter. The controlling method further includes the step of, in response to the instruction to switch the vehicle from the drivable state to the undrivable state, determining whether the first connecting portion is normally disconnected and subsequently confirming the operation of the second connecting portion.

More preferably, the power supply system for driving the vehicle further includes a voltage sensor detecting the voltage of the output of the voltage converter and a load connected to the output of the voltage converter. The controlling method further includes the steps of, after it is confirmed that the first connecting portion is in a disconnected state, giving an instruction for disconnection to the second connecting portion; and causing the load to consume electric power and observing the output of the voltage sensor to determine whether disconnection of the second connecting portion is normally effected.

Preferably, the capacitor includes a plurality of electric double layer condensers connected in series.

According to the present invention, the power supply system for driving the vehicle can be checked in a short period of time.

BEST MODES FOR CARRYING OUT THE INVENTION

The embodiments of the present invention will be hereinafter described in detail with reference to the accompanying drawings, in which the same or corresponding components are designated by the same reference characters, and description thereof will not be repeated.

Figure 1:
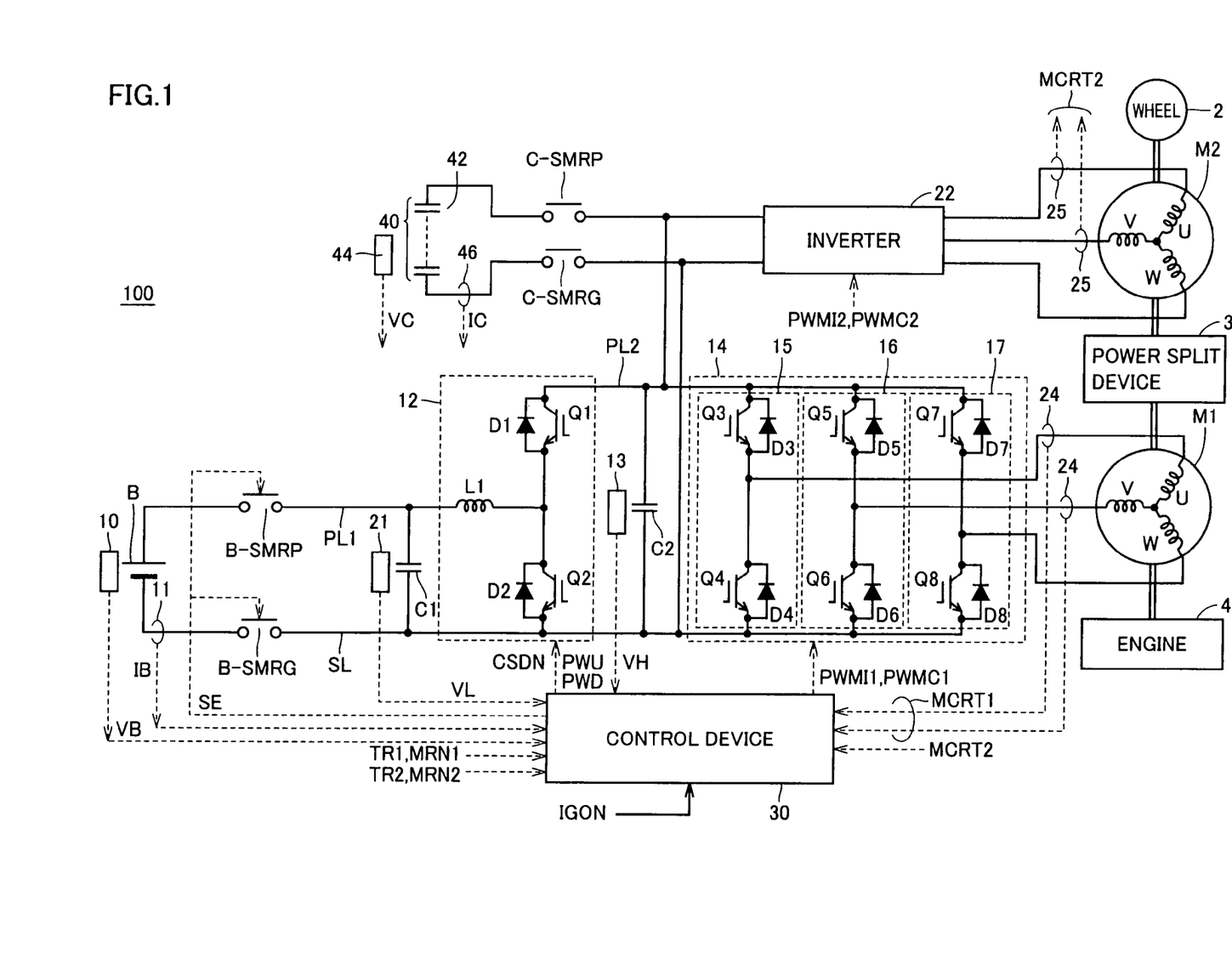
FIG. 1 is a circuit diagram of the configuration of a vehicle according to an embodiment of the present invention.

FIG. 1 is a circuit diagram of the configuration of a vehicle according to an embodiment of the present invention.

Referring to FIG. 1, a vehicle 100 includes a battery B, a capacitor 40, an engine 4, motor generators M1 and M2, a power split device 3, a wheel 2, and a control device 30.

Power split device 3 is coupled to engine 4 and motor generators M1, M2 to distribute the power among them. For example, a planetary gear mechanism having three rotation shafts including a sun gear, a planetary carrier and a ring gear can be used as a power split device. These three rotation shafts are connected to respective rotation shafts of engine 4 and motor generators M1, M2. It is to be noted that the rotation shaft of motor generator M2 is coupled to wheel 2 by a reduction gear or a differential gear which is not shown. A speed reducer for the rotation shaft of motor generator M2 may further be incorporated into power split device 3.

Vehicle 100 further includes a system main relay B-SMRG connected to a negative electrode of battery B and a system main relay B-SMRP connected to a positive electrode of battery B. The conduction/non-conduction state of each of system main relays B-SMRG and B-SMRP is controlled in accordance with a control signal SE received from control device 30.

Vehicle 100 further includes a voltage sensor 10 measuring a voltage VB across terminals of battery B and a current sensor 11 detecting a current IB flowing through battery B.

A nickel-hydrogen or lithium-ion secondary battery, a fuel cell, and the like can be used as battery B.

Vehicle 100 further includes a smoothing condenser C1 connected between a power supply line PL1 and a ground line SL, a voltage sensor 21 detecting a voltage VL across both ends of smoothing condenser C1 for output to control device 30, a boost converter 12 boosting the voltage across the terminals of smoothing condenser C1, a smoothing condenser C2 smoothing the voltage boosted by boost converter 12, a voltage sensor 13 detecting a voltage VH across the terminals of smoothing condenser C2 for output to control device 30, and an inverter 14 converting a DC (Direct Current) voltage applied from boost converter 12 into a three-phase AC (Alternating Current) for output to motor generator M1.

Boost converter 12 includes a reactor L1 having one end connected to power supply line PL1, IGBT elements Q1 and Q2 connected in series between a power supply line PL2 and ground line SL, and diodes D1 and D2 connected in parallel to IGBT elements Q1 and Q2, respectively.

Reactor L1 has the other end connected to an emitter of IGBT element Q1 and a collector of IGBT element Q2. Diode D1 has a cathode connected to a collector of IGBT element Q1 and has an anode connected to the emitter of IGBT element Q1. Diode D2 has a cathode connected to the collector of IGBT element Q2 and has an anode connected to an emitter of IGBT element Q2.

Inverter 14 receives the boosted voltage from boost converter 12 and drives motor generator M1 in order to start engine 4, for example. Inverter 14 returns to boost converter 12 the electric power generated in motor generator M1 by the mechanical power transmitted from engine 4. In this case, boost converter 12 is controlled by control device 30 so as to operate as a step-down circuit.

Inverter 14 includes a U-phase arm 15, a V-phase arm 16 and a W-phase arm 17. U-phase arm 15, V-phase arm 16 and W-phase arm 17 are connected in parallel between power supply line PL2 and ground line SL.

U-phase arm 15 includes IGBT elements Q3 and Q4 connected in series between power supply line PL2 and ground line SL, and diodes D3 and D4 connected in parallel to IGBT elements Q3 and Q4, respectively. Diode D3 has a cathode connected to a collector of IGBT element Q3 and has an anode connected to an emitter of IGBT element Q3. Diode D4 has a cathode connected to a collector of IGBT element Q4 and has an anode connected to an emitter of IGBT element Q4.

V-phase arm 16 includes IGBT elements Q5 and Q6 connected in series between power supply line PL2 and ground line SL, and diodes D5 and D6 connected in parallel to IGBT elements Q5 and Q6, respectively. Diode D5 has a cathode connected to a collector of IGBT element Q5 and has an anode connected to an emitter of IGBT element Q5. Diode D6 has a cathode connected to a collector of IGBT element Q6 and has an anode connected to an emitter of IGBT element Q6.

W-phase arm 17 includes IGBT elements Q7 and Q8 connected in series between power supply line PL2 and ground line SL, and diodes D7 and D8 connected in parallel to IGBT elements Q7 and Q8, respectively. Diode D7 has a cathode connected to a collector of IGBT element Q7 and has an anode connected to an emitter of IGBT element Q7. Diode D8 has a cathode connected to a collector of IGBT element Q8 and has an anode connected to an emitter of IGBT element Q8.

Motor generator M1 is a three-phase permanent magnet synchronous motor, in which three coils of the U-, V- and W-phases each have one end connected in common to a neutral point. The U-phase coil has the other end connected to a connection node of IGBT elements Q3 and Q4. The V-phase coil has the other end connected to a connection node of IGBT elements Q5 and Q6. The W-phase coil has the other end connected to a connection node of IGBT elements Q7 and Q8.

A current sensor 24 detects the current flowing through motor generator M1 as a motor current value MCRT1 and outputs motor current value MCRT1 to control device 30.

Vehicle 100 further includes an inverter 22 connected in parallel to inverter 14 with respect to boost converter 22, a capacitor 40 accumulating the electric power boosted by boost converter 12, a system main relay C-SMRP connecting one electrode of capacitor 40 to power supply line PL2, and a system main relay C-SMRG connecting the other electrode of capacitor 40 to ground line SL.

Although not shown, the conduction/non-conduction state of each of system main relays C-SMRG and C-SMRP is also controlled in accordance with control signal SE received from control device 30.

Vehicle 100 further includes a voltage sensor 44 measuring a voltage VC across the terminals of capacitor 40 and a current sensor 46 detecting a current IC flowing through capacitor 40.

Inverter 22 converts the DC voltage output from boost converter 12 into a three-phase AC and outputs it to motor generator M2 driving wheel 2. In accordance with regenerative braking, inverter 22 returns the electric power generated in motor generator M2 to boost converter 12. In this case, boost converter 12 is controlled by control device 30 so as to operate as a step-down circuit. The internal configuration of inverter 22 which is not shown is the same as that of inverter 14, and detailed description thereof will not be repeated.

Control device 30 receives each value of torque command values TR1, TR2, motor rotation speed MRN1, MRN2, voltage VB, VH, VC, and current IB, IC; motor current values MCRT1, MCRT2; and a start-up signal IGON. Control device 30 outputs to boost converter 12 a control signal PWU giving an instruction to boost the voltage, a control signal PWD giving an instruction to lower the voltage, and a signal CSDN giving an instruction to prohibit the operation.

Furthermore, control device 30 outputs to inverter 14 a drive instruction PWMI1 for converting the DC voltage which is the output of boost converter 12 into an AC voltage for driving motor generator M1, and a regeneration instruction PWMC1 for converting the AC voltage generated in motor generator M1 into a DC voltage and returning it to the boost converter 12 side.

Similarly, control device 30 outputs to inverter 22 a drive instruction PWMI2 for converting the DC voltage into an AC voltage for driving motor generator M2, and a regeneration instruction PWMC2 for converting the AC voltage generated in motor generator M2 into a DC voltage and returning it to the boost converter 12 side.

Capacitor 40 is a power storage device which is greater in capacity than smoothing condenser C2, and includes, for example, a plurality of electric double layer condensers 42 connected in series. The electric double layer condenser has high energy density but has breakdown voltage of approximately 2.5 to 2.7 V per cell. Accordingly, with respect to the voltage of approximately 300 to 650 V output from boost converter 12, it is necessary to connect the cells of the plurality of electric double layer condensers 42 in series to cause each cell to share the voltage.

While only smoothing condenser C2 having a capacitance sufficient to smooth the ripple of the output voltage of boost converter 12, for example, a capacitance of several thousand μF, is conventionally mounted, capacitor 40 having a capacitance of, for example, approximately 0.5 to 2.0 F is further mounted in parallel thereto.

Consequently, for example, when abrupt acceleration is attempted for overtaking another vehicle during the EV running, it is possible to increase the power with which motor generator M2 rotates wheel 2 while concurrently rotating motor generator M1 with the power supplied by capacitor 40 for starting engine 4, and to further add the power generated by engine 4 to the acceleration power. Since capacitor 40 has an instantaneous outputtable power greater than that of battery B, battery B is supplied with power by capacitor 40 to thereby allow the acceleration response to be further improved.

Figure 2:
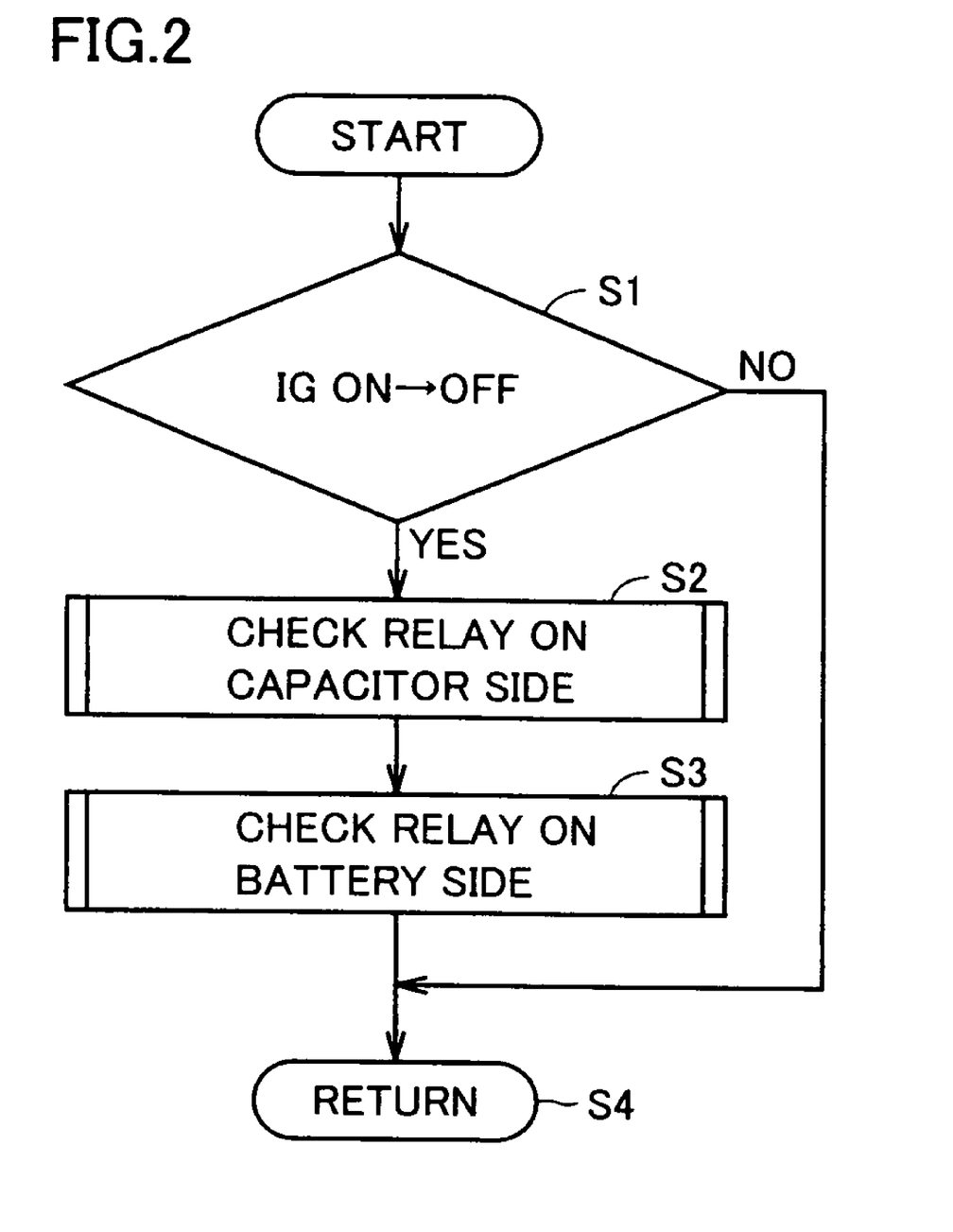
FIG. 2 is a flowchart showing the procedure for confirming the operation of the relay performed in a vehicle 100 in FIG. 1.

FIG. 2 is a flowchart showing the procedure for confirming the operation of the relay performed in vehicle 100 in FIG. 1.

Referring to FIGS. 1 and 2, control device 30 performs the process of this flowchart at regular time intervals or every time the predetermined condition is satisfied. In step S1, control device 30 first observes a signal IG and detects whether or not signal IG changes from the ON state to the OFF state. The state of signal IG at the time when this process was previously performed has been stored. If this stored state is an ON state and the state of signal IG at the time when this process is currently performed is an OFF state, the process proceeds to step S2, and if not, the process proceeds to step S4.

In step S2, it is checked whether each of system main relays C-SMRP and C-SMRG on the capacitor 40 side is welded.

As described above, the power supply system for driving the vehicle mounted in vehicle 100 includes battery B, boost converter 12 boosting the voltage of battery B, capacitor 40 to which the voltage boosted by boost converter 12 is applied across the electrodes, system main relays C-SMRP and C-SMRG provided between capacitor 40 and the output of boost converter 12 for connection and disconnection between capacitor 40 and boost converter 12, and control device 30 controlling boost converter 12 and system main relays C-SMRP, C-SMRG.

System main relay C-SMRP connects the positive electrode side of capacitor 40 to a positive output node of boost converter 12. System main relay C-SMRG connects the negative electrode side of capacitor 40 to a negative output node of boost converter 12.

In step S2, control device 30, after giving an instruction for disconnection to system main relay C-SMRP, causes boost converter 12 to change the voltage of the output and determines whether system main relay C-SMRP which is supposed to have been disconnected is normally disconnected or not.

The power supply system for driving the vehicle further includes voltage sensor 44 measuring the voltage of capacitor 40. In accordance with the change of signal IG to the OFF state in response to the instruction to switch the vehicle from the drivable state to the undrivable state, that is, in response to the operation of the ignition key switch, control device 30 gives an instruction for disconnection to system main relay C-SMRP, and subsequently causes boost converter 12 to change the output voltage to observe the output of voltage sensor 44 for determination. It is to be noted that the instruction to switch from the drivable state to the undrivable state may be given by the operation other than that of the ignition key switch or by the combination of the key that allows the vehicle to wirelessly recognize that the driver possesses the key and the push switch.

Control device 30 then resets the output voltage of boost converter 12 to cause system main relays C-SMRP and C-SMRG each to be in a connected state. After giving an instruction for disconnection to system main relay C-SMRG, control device 30 causes boost converter 12 to change the output voltage and observes the output of voltage sensor 44 for further determination.

Thus, the process of step S2 is completed. Subsequent to step S2, the process of step S3 is performed. In step S3, the relay on the battery side is checked.

As described above, the power supply system for driving the vehicle mounted in vehicle 100 includes system main relays B-SMRP and B-SMRG provided between battery B and the input of boost converter 12 for connection and disconnection between battery B and boost converter 12.

In response to the instruction to switch the vehicle from the drivable state to the undrivable state, that is, the change of signal IG from the ON state to the OFF state, control device 30 determines in step S2 whether system main relays C-SMRP and C-SMRG each are normally disconnected, and subsequently confirms the operation of system main relay B-SMRP in step S3.

The power supply system for driving the vehicle includes voltage sensor 13 detecting the voltage of the output of boost converter 12 and a load connected to the output of boost converter 12. In step S3, after it is confirmed that system main relays C-SMRP and C-SMRG each are in a disconnected state, control device 30 gives an instruction for disconnection to system main relay B-SMRP, causes the load to consume electric power and observes the output of voltage sensor 13 to determine whether disconnection of system main relay B-SMRP is normally effected.

When the process of step S3 is completed, the process proceeds to step S4. In step S4, the control is passed to the main routine.

Figure 3:
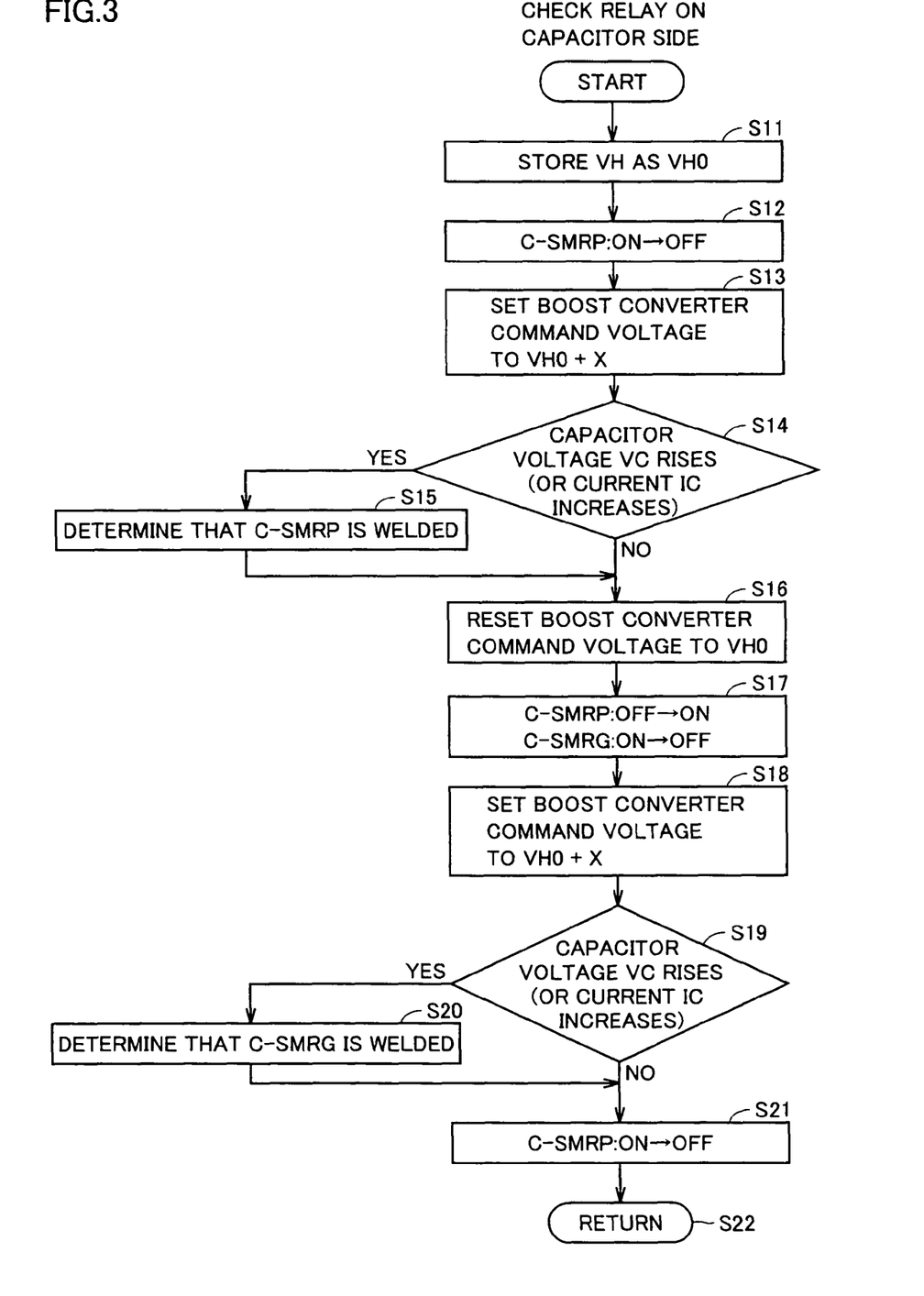
FIG. 3 is a flowchart showing the process of step S2 in FIG. 2 in greater detail.

FIG. 3 is a flowchart showing the process of step S2 in FIG. 2 in greater detail.

Referring to FIGS. 1 and 3, upon start of the process, control device 30 stores voltage VH measured using voltage sensor 13 as a voltage VH0 in the internal memory in step S11.

Figure 4:
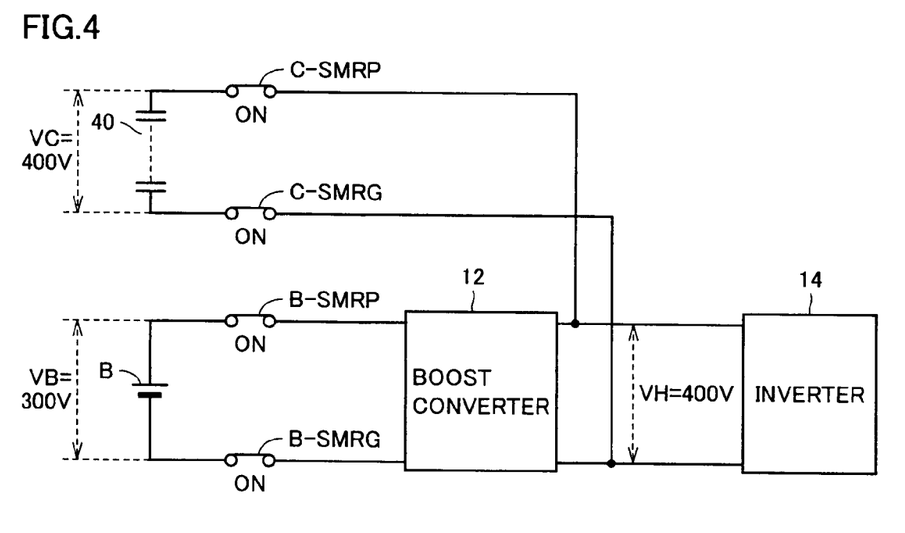
FIG. 4 is a diagram of the state of the power supply system in step S11 in FIG. 3.

FIG. 4 is a diagram of the state of the power supply system in step S11 in FIG. 3.

Referring to FIG. 4, battery voltage VB is assumed to be 300 V, which is boosted to 400 V in boost converter 12 and supplied to inverter 14 and capacitor 40. In this state, system main relays B-SMRP, B-SMRG, C-SMRP, and C-SMRG each are in a conduction state.

Referring again to FIG. 3, subsequent to step S11, the process of step S12 is performed. In step S12, control device 30 causes system main relay C-SMRP to change from the conduction state to the non-conduction state.

The process then proceeds from step S12 to step S13, and control device 30 sets a boost command voltage to VH0+X for boost converter 12.

Figure 5:
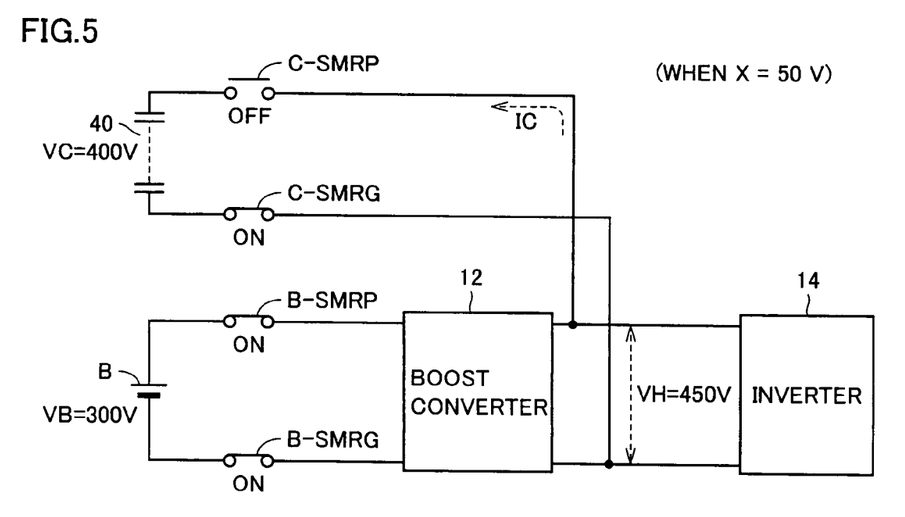
FIG. 5 is a diagram of the state of the power supply system when X=50 V in step S13.

FIG. 5 is a diagram of the state of the power supply system when X=50 V in step S13.

Referring to FIG. 5, since a boost command value is assumed to be 450 V, boost converter 12 increases voltage VH supplied to inverter 14 to 450 V. In this case, if system main relay C-SMRP is properly controlled to be in a non-conduction state, a capacitor current IC does not flow and voltage VC of capacitor 40 does not change from the state in FIG. 4 to be kept at 400 V.

However, if system main relay C-SMRP is welded, capacitor current IC should flow and voltage VC also should increase to 450 V. Although it is assumed that X=50 V in FIG. 5, the value X is preferably assumed to be approximately 50 V to 100 V in consideration of the impedance of the capacitor. Value X may also be a negative value of approximately −50 V to −100 V.

After a potential difference occurs, it is determined in step S14 in FIG. 3 whether capacitor voltage VC rises or capacitor current IC increases. When it is detected that voltage VC rises or current IC increases, the process proceeds to step S15 and control device 30 determines that system main relay C-SMRP is welded. The process then proceeds from step S15 to step S16.

When neither rise in capacitor voltage VC nor increase in capacitor current IC is detected in step S14, it is considered that system main relay C-SMRP is properly controlled to be in the non-conduction state, and thus, the process proceeds directly to step S16.

In step S16, control device 30 resets the command value of the boosted voltage of boost converter 12 from VH0+X to VH0. In step S17, control device 30 causes system main relay C-SMRP to change from the non-conduction state to the conduction state and system main relay C-SMRG to change from the conduction state to the non-conduction state.

As the process proceeds from step S17 to step S18, control device 30 again sets the boost command voltage to VH0+X for boost converter 12.

Figure 6:
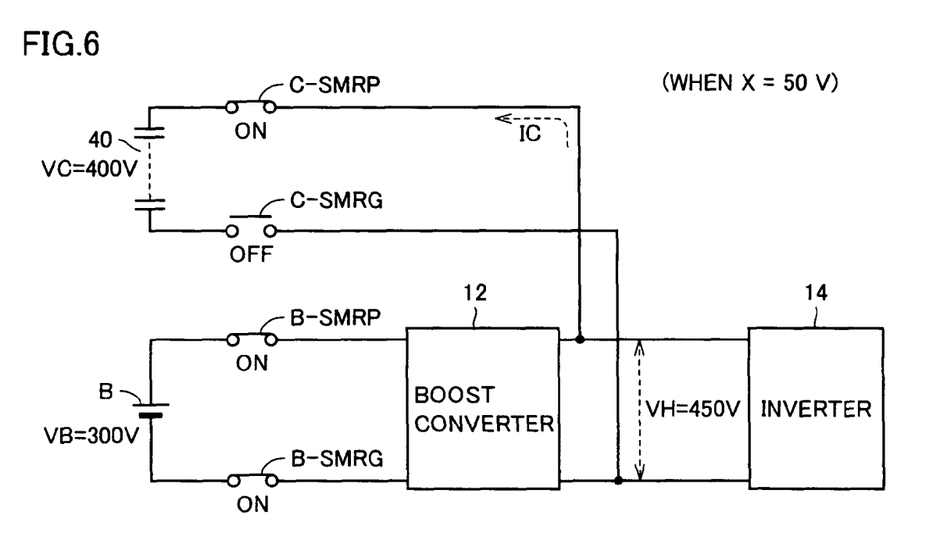
FIG. 6 is a diagram of the state of the power supply system when X=50 V in step S18.

FIG. 6 is a diagram of the state of the power supply system when X=50 V in step S18.

Referring to FIG. 6, since the boost command value is assumed to be 450 V, boost converter 12 increases voltage VH supplied to inverter 14 to 450 V. In this case, if system main relay C-SMRG is properly controlled to be in a non-conduction state, capacitor current IC does not flow and voltage VC of capacitor 40 does not change from the state in FIG. 4 to be kept at 400 V.

However, if system main relay C-SMRG is welded, capacitor current IC should flow and voltage VC also should increase to 450 V. Although it is assumed that X=50 V in FIG. 6, the value X is preferably assumed to be approximately 50 V to 100 V in consideration of the impedance of the capacitor. Value X may also be a negative value of approximately −50 V to −100 V.

After a potential difference occurs, it is determined in step S19 in FIG. 3 whether capacitor voltage VC rises or capacitor current IC increases. When it is detected that voltage VC rises or current IC increases, the process proceeds to step S20, and if not, the process proceeds directly to step S21. In step S20, control device 30 determines that system main relay C-SMRG is welded. The process then proceeds from step S20 to step S21.

Referring again to FIG. 3, in step S21, system main relay C-SMRP is switched from the conduction state to the non-conduction state. Both of the positive and negative electrodes of capacitor 40 are caused to be disconnected from the inverter and the boost converter, and, in step S22, the control is then passed to the flowchart in FIG. 2.

Figure 7:
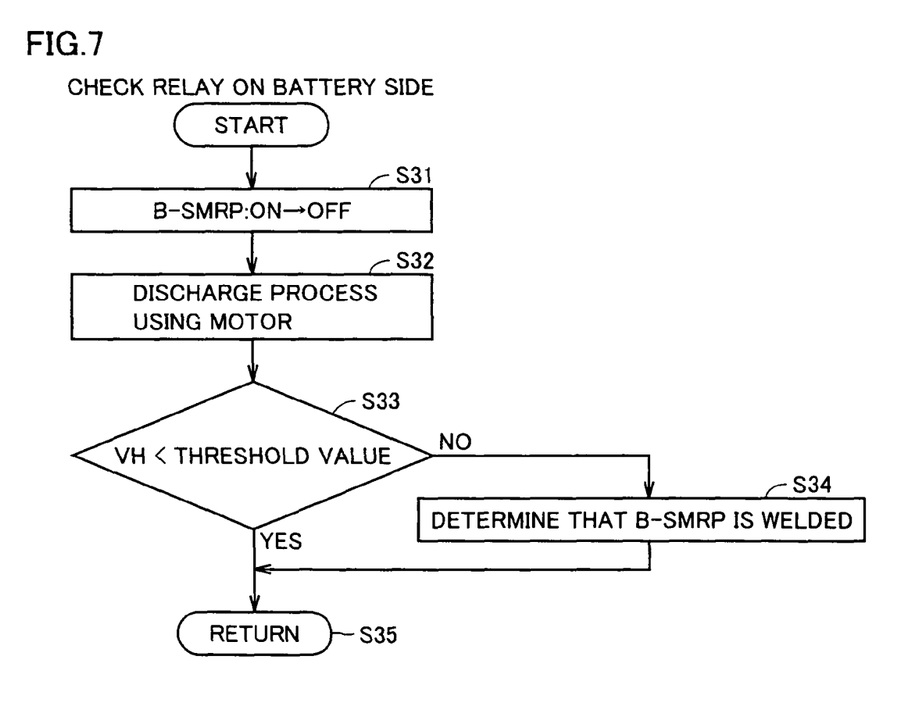
FIG. 7 is a flowchart showing the process of step S3 in FIG. 2 in greater detail.

FIG. 7 is a flowchart showing the process of step S3 in FIG. 2 in greater detail.

Referring to FIGS. 1 and 7, when the process of checking the relay on the battery side is first started, control device 30 switches system main relay B-SMRP from the conduction state to the non-conduction state in step S31. In step S32, the discharge process is performed using a motor.

Figure 8:
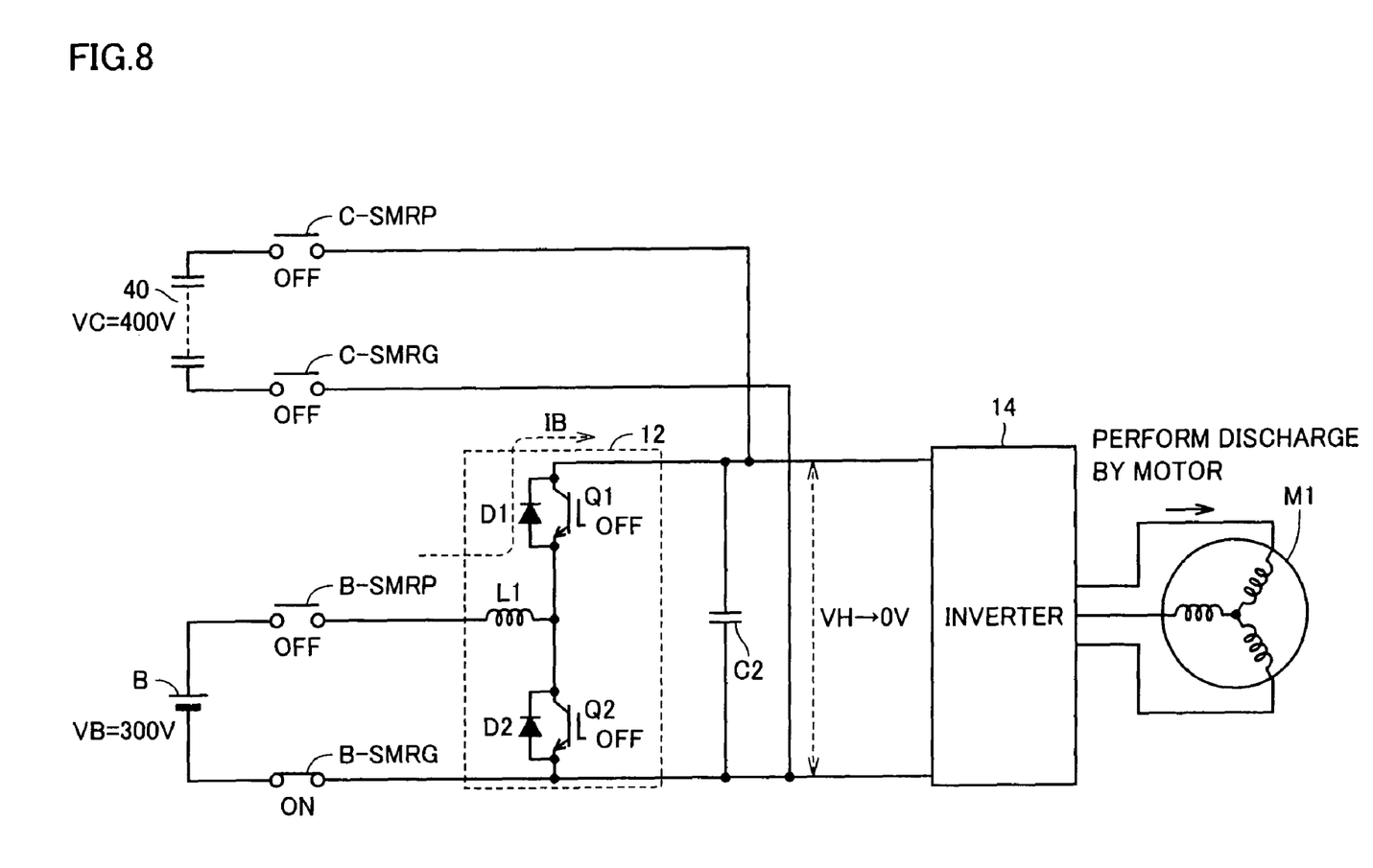
FIG. 8 is a diagram for illustrating the discharge process in step S32 in FIG. 7.

FIG. 8 is a diagram for illustrating the discharge process in step S32 in FIG. 7.

Referring to FIG. 8, inverter 14 is controlled such that, in motor generator M1, a q-axis current generating rotation torque does not flow but a d-axis current generating no rotation torque flows through a stator coil. Consequently, the electric charge charged in condenser C2 is consumed and voltage VH drops close to 0 V. In this case, if system main relay B-SMRP is welded and is not in the non-conduction state, battery current IB as shown in FIG. 8 flows to be supplied to inverter 14, with the result that voltage VH does not readily drop. Thus, if voltage VH does not fall below a certain threshold value after a predetermined period of time has passed, it is determined that system main relay B-SMRP is welded.

In other words, in step S33 in FIG. 7, it is determined whether voltage VH is less than a predetermined threshold value. If voltage VH is not less than the threshold value, the process proceeds to step S34 and control device 30 determines that system main relay B-SMRP is welded. The process then proceeds from step S34 to step S35. If voltage VH is less than the threshold value in step S33, it is considered that system main relay B-SMRP is not welded, and therefore, the process proceeds directly to step S35.

In step S35, the control is passed to the flowchart in FIG. 2. It is to be noted that system main relay B-SMRG is checked when starting the vehicle.

As described above, the power supply system of the present embodiment controls the boost converter provided between the battery and the capacitor to determine whether the relay on the capacitor side is welded or not. This allows the period of time for determination to be shortened in the case of the determination for each relay on the capacitor side and the battery side.

Furthermore, prior to the determination for the welding of the relay on the battery side, it is determined whether the relay on the capacitor side is welded or not, with the result that the large-capacity capacitor is disconnected and the electric charge of smoothing condenser C2 is then discharged. Therefore, the period of time for determining whether the relay on the battery side is welded can also be shortened.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A power supply system for driving a vehicle, comprising:
   a secondary battery;
   a voltage converter boosting a voltage of said secondary battery;
   a capacitor to which the voltage boosted by said voltage converter is applied across electrodes;
   a first connecting portion provided between said capacitor and an output of said voltage converter for connection and disconnection between said capacitor and said voltage converter; and
   a control device controlling said voltage converter and said first connecting portion,
   said control device, after giving an instruction for disconnection to said first connecting portion, causing said voltage converter to change a voltage of the output to determine whether said first connecting portion is normally disconnected.

2. The power supply system for driving the vehicle according to claim 1, wherein said first connecting portion includes
   a first relay connecting a positive electrode of said capacitor to a positive output node of said voltage converter, and
   a second relay connecting a negative electrode of said capacitor to a negative output node of said voltage converter.

3. The power supply system for driving the vehicle according to claim 2, further comprising a voltage sensor measuring a voltage of said capacitor, wherein
   said control device, in response to an instruction to switch the vehicle from a drivable state to an undrivable state, gives an instruction for disconnection to one of said first and second relays, and subsequently, causes said voltage converter to change the output voltage and observes an output of said voltage sensor for a first determination.

4. The power supply system for driving the vehicle according to claim 3, wherein said control device, after said first determination, resets the output voltage of said voltage converter to cause said first and second relays each to be in a connected state, gives an instruction for disconnection to the other one of said first and second relays, and subsequently, causes said voltage converter to change the output voltage and observes the output of said voltage sensor for a second determination.

5. The power supply system for driving the vehicle according to claim 1, further comprising a second connecting portion provided between said secondary battery and an input of said voltage converter for connection and disconnection between said secondary battery and said voltage converter, wherein
   said control device, in response to an instruction to switch the vehicle from a drivable state to an undrivable state, determines whether said first connecting portion is normally disconnected and subsequently confirms an operation of said second connecting portion.

6. The power supply system for driving the vehicle according to claim 5, further comprising:
a voltage sensor detecting the voltage of the output of said voltage converter; and
a load connected to the output of said voltage converter, wherein
said control device, after it is confirmed that said first connecting portion is in a disconnected state, gives an instruction for disconnection to said second connecting portion, causes said load to consume electric power and observes an output of said voltage sensor to determine whether disconnection of said second connecting portion is normally effected.

7. The power supply system for driving the vehicle according to claim 1, wherein said capacitor includes a plurality of electric double layer condensers connected in series.

8. A method of controlling a power supply system for driving a vehicle including a secondary battery, a voltage converter boosting a voltage of said secondary battery, a capacitor to which the voltage boosted by said voltage converter is applied across electrodes, a first connecting portion provided between said capacitor and an output of said voltage converter for connection and disconnection between said capacitor and said voltage converter, and a control device controlling said voltage converter and said first connecting portion, the method comprising the steps of:
giving an instruction for disconnection to said first connecting portion; and
determining whether said first connecting portion is normally disconnected by causing said voltage converter to change a voltage of the output after giving said instruction for disconnection.

9. The method of controlling the power supply system for driving the vehicle according to claim 8, wherein said first connecting portion includes
a first relay connecting a positive electrode of said capacitor to a positive output node of said voltage converter, and
a second relay connecting a negative electrode of said capacitor to a negative output node of said voltage converter.

10. The method of controlling the power supply system for driving the vehicle according to claim 9, said power supply system for driving the vehicle further comprising a voltage sensor measuring a voltage of said capacitor, wherein
said step of giving the instruction for disconnection, in response to an instruction to switch the vehicle from a drivable state to an undrivable state, gives an instruction for disconnection to one of said first and second relays, and
said step of determining causes said voltage converter to change the output voltage and observes an output of said voltage sensor for a first determination.

11. The method of controlling the power supply system for driving the vehicle according to claim 10, further comprising the steps of:
after said first determination, resetting the output voltage of said voltage converter to cause said first and second relays each to be in a connected state and giving an instruction for disconnection to the other one of said first and second relays; and
after giving the instruction for disconnection to said other one, causing said voltage converter to change the output voltage and observing the output of said voltage sensor for a second determination.

12. The method of controlling the power supply system for driving the vehicle according to claim 8, said power supply system for driving the vehicle further comprising a second connecting portion provided between said secondary battery and an input of said voltage converter for connection and disconnection between said secondary battery and said voltage converter, wherein
said controlling method further comprises the step of, in response to an instruction to switch the vehicle from a drivable state to an undrivable state, determining whether said first connecting portion is normally disconnected and subsequently confirming an operation of said second connecting portion.

13. The method of controlling the power supply system for driving the vehicle according to claim 12, said power supply system for driving the vehicle further comprising:
a voltage sensor detecting the voltage of the output of said voltage converter; and
a load connected to the output of said voltage converter, wherein
said controlling method further comprises the steps of:
after it is confirmed that said first connecting portion is in a disconnected state, giving an instruction for disconnection to said second connecting portion; and
causing said load to consume electric power and observing an output of said voltage sensor to determine whether disconnection of said second connecting portion is normally effected.

14. The method of controlling the power supply system for driving the vehicle according to claim 8, wherein said capacitor includes a plurality of electric double layer condensers connected in series.

* * * * *